(12) United States Patent
Lee et al.

(10) Patent No.: US 7,673,710 B2
(45) Date of Patent: Mar. 9, 2010

(54) TRAVELING ROBOT

(75) Inventors: Youn-baek Lee, Suwon-si (KR);
Soo-sang Yang, Suwon-si (KR);
Yeon-taek Oh, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 521 days.

(21) Appl. No.: 11/563,861

(22) Filed: Nov. 28, 2006

(65) Prior Publication Data
US 2007/0137905 A1 Jun. 21, 2007

(30) Foreign Application Priority Data
Dec. 2, 2005 (KR) ...................... 10-2005-0117170

(51) Int. Cl.
*B62D 61/12* (2006.01)
(52) U.S. Cl. .......................... 180/8.2; 180/8.1; 280/755
(58) Field of Classification Search ................... 180/8.2, 180/8.1; 280/755
See application file for complete search history.

(56) References Cited

U.S. PATENT DOCUMENTS

| | | | | |
|---|---|---|---|---|
| 3,109,506 A | * | 11/1963 | Schroter et al. | 180/8.1 |
| 3,438,641 A | * | 4/1969 | Bradley | 280/5.28 |
| 4,566,707 A | * | 1/1986 | Nitzberg | 180/8.2 |
| 4,730,684 A | * | 3/1988 | Pedersen | 180/22 |
| 5,350,033 A | * | 9/1994 | Kraft | 180/167 |
| 5,409,250 A | * | 4/1995 | Csotonyi | 280/304.1 |
| 6,443,543 B1 | * | 9/2002 | Chiang | 312/223.3 |
| 7,264,272 B2 | * | 9/2007 | Mulhern et al. | 280/755 |
| 7,314,220 B2 | * | 1/2008 | Turturiello et al. | 280/5.5 |
| 7,398,843 B2 | * | 7/2008 | Buehler et al. | 180/8.1 |
| 2001/0004719 A1 | | 6/2001 | Sommer | |
| 2005/0206149 A1 | * | 9/2005 | Mulhern et al. | 280/755 |
| 2007/0018418 A1 | * | 1/2007 | Huang | 280/124.111 |
| 2007/0023209 A1 | * | 2/2007 | Wu | 180/65.1 |

FOREIGN PATENT DOCUMENTS

| | | |
|---|---|---|
| JP | 2000-202792 | 7/2000 |
| KR | 2004-61323 | 7/2004 |

* cited by examiner

*Primary Examiner*—Lesley Morris
*Assistant Examiner*—Michael R Stabley
(74) *Attorney, Agent, or Firm*—Stanzione & Kim LLP

(57) ABSTRACT

A traveling robot includes a body frame having a front wheel; a rear wheel which is disposed on a rear side of the front wheel along a traveling direction; a rear frame which supports the rear wheel and is supported by the body frame so as to move vertically; a driving wheel which is disposed between the front wheel and the rear wheel in the traveling direction; a driving frame which supports the driving wheel and is coupled to the body frame by a hinge whose axis is parallel to an axis of the driving wheel; and a linkage member which is coupled to the driving frame to be contacted with or separated from the rear frame as the driving frame is rotated relative to the body frame.

19 Claims, 11 Drawing Sheets

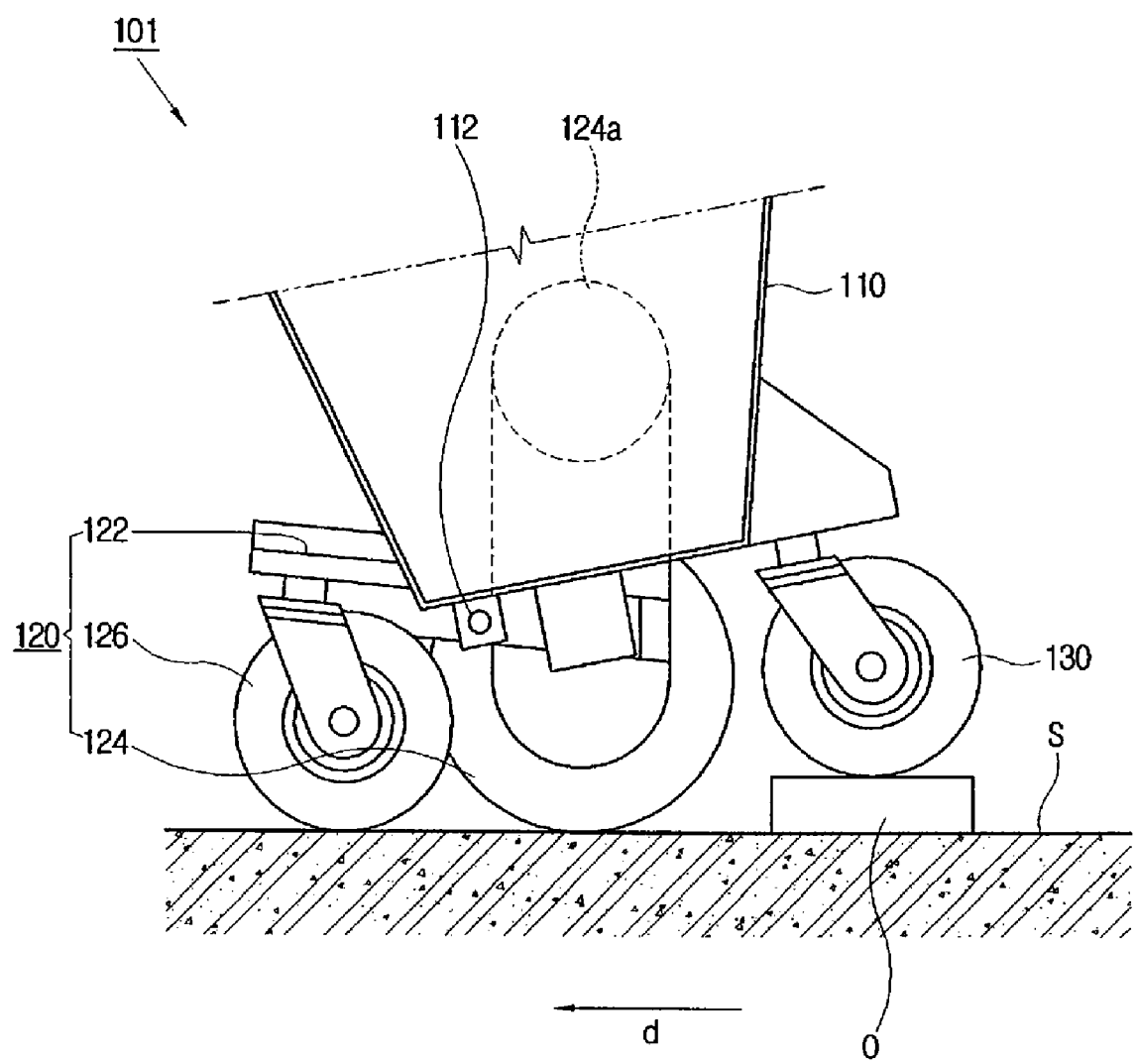

TRAVELING ROBOT

CROSS-REFERENCE TO RELATED APPLICATIONS

This application claims priority from Korean Patent Application No. 2005-0117170, filed on Dec. 2, 2005, in the Korean Intellectual Property Office, the disclosure of which is incorporated herein by reference.

BACKGROUND OF THE INVENTION

1. Field of the Invention

The present general inventive concept relates to a traveling robot, and more particularly, to a traveling robot to enhance a traveling performance by its simple structure.

2. Description of the Related Art

Generally, a robot performs dangerous, simply repetitive, precise, large-scale or a lot of work in place of a human being. The robot has been widely utilized in the areas of industry, military, home and so on according to the development of the robotics. As, in many cases, the robot moves between spaces to perform predetermined operations, a traveling device is necessary to such kind of a robot. Thus, research on a technology in the traveling device of the robot has been made, especially on a technology about the traveling device by which the robot can smoothly travel while keeping its balance without rotating when traveling on an uneven surface such as a traveling surface with steps.

FIGS. 1A to 1C are schematic views illustrating traveling states of a conventional traveling robot. As illustrated in FIGS. 1A to 1C, a traveling robot 101 has a housing 110, a rear wheel 130 and a driving part 120 to travel on a travel surface S. The housing 110 is provided with a function part (not illustrated) for performing a predetermined function. The rear wheel 130 is fixedly supported to a rear side, which is located opposite to a traveling direction d of the housing 110. The rear wheel 130 rotates idly and serves to support the housing 110 against the surface S being traveled.

The driving part 120 has a frame 122, a driving wheel 124 and a front wheel 126. The frame 122 is rotatably coupled to the housing 110 by a hinge 112. The driving wheel 124 is disposed on the right and left sides of the frame 122 respectively. The driving wheel 124 receives driving power from a driving motor 124a and allows the housing 110 to travel in the traveling direction d. The front wheel 126 is supported at a front side of the housing 110, which is located in front of the driving wheel 124 in the traveling direction d of the frame 122. The single front wheel 126 is disposed and rotates idly to support the housing 110 with respect to the travel surface S. The frame 122 is rotated on the housing 110 by the hinge 112, thus the driving wheel 124 and the front wheel 126 are integrally rotated with the frame 122. The above traveling robot 101 is disclosed in U.S. Pat. No. 5,350,033.

However, when such a robot 101 encounters an obstacle 0, such as a stepped part, on a road being traveled, its traveling performance may be deteriorated. As illustrated in FIG. 1A, when the traveling robot 101 surmounts the obstacle 0, the front wheel 126 firstly climbs up the obstacle 0. Accordingly, the frame 122 is rotated about the hinge 112 in a direction for the housing 112 to maintain its balance.

As illustrated in FIG. 1B, when the traveling robot 101 further travels in the direction d, the driving wheel 124 climbs up the obstacle 0, so that the center of gravity of the traveling robot 101 shifts backward and is concentrated upon the rear wheel 130. In this case, the driving wheel 124 may not receive a traction force enough for the driving, which makes the rotating driving wheel 124 slip on the obstacle 0. As a result, the traveling robot 101 cannot surmount the obstacle 0 easily.

Referring to FIG. 1C, when the traveling robot 101 further travels in the traveling direction d, the driving wheel 24 surmounts the obstacle 0 and the rear wheel 130 is positioned on the obstacle 0, so that the center of gravity of the traveling robot 101 rapidly shifts to the front side of the robot 101. In this case, the front wheel 126 abruptly contacts the traveling surface S, whereby the housing 112 may begin to sway.

Furthermore, the deterioration concerning the traveling performance of the traveling robot 101 as described above may become even worse when the height of the obstacles 0 to be surmounted by right and left driving wheel 124 are different from each other. That is, since the single front wheel 126 and a pair of driving wheels 124 are supported by and integrally linked with the frame 122, the traveling robot 101 may not be adapted to the height difference between the obstacles 0 to be surmounted by the right and left driving wheels 124, and thus the slipping of the driving wheel 124 and the swaying of the housing 110 may be intensified.

SUMMARY OF THE INVENTION

The present general inventive concept provides a traveling robot to enhance a traveling performance by its simple structure.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept can be achieved by providing a traveling robot comprising: a body frame having a front wheel; a rear wheel which is disposed on a rear side of the front wheel along a traveling direction; a rear frame which supports the rear wheel and is supported by the body frame so as to move vertically; a driving wheel which is disposed between the front wheel and the rear wheel in the traveling direction; a driving frame which supports the driving wheel and is coupled to the body frame by a hinge whose axis is parallel to an axis of the driving wheel; and a linkage member which is coupled to the driving frame to be contacted with or separated from the rear frame as the driving frame is rotated relative to the body frame.

The hinge may be positioned between the driving wheel and the rear wheel in the traveling direction.

The traveling robot may further comprise a rear pressing member which is provided between the body frame and the rear frame to press the rear frame upwardly relative to the body frame.

The traveling robot may further comprise a guide which is provided between the body frame and the rear frame and extends in a direction perpendicular to the axis of the driving wheel to guide the rear frame to allow the rear frame to move vertically relative to the body frame.

The rear frame may comprise a sliding part to be slidably contacted with the linkage member.

The traveling robot may further comprise a drive pressing member which is provided between the body frame and the driving frame to press the driving frame to rotate so that the driving wheel can move downwardly relative to the body frame.

The hinge may be positioned within a predetermined distance from the center of gravity of the traveling robot.

Each of the rear wheel, the rear frame, the driving wheel, the driving frame and the linkage member may be disposed on opposite sides of the body frame to be operated independently.

The foregoing and/or other aspects and utilities of the present general inventive concept can be achieved by providing a traveling robot comprising a body frame having a front wheel and at least one stopper; and at least one driving assembly disposed between the front wheel and the at least one stopper, the at least one driving assembly comprising a drive wheel to drive the robot to travel, a drive frame connected at a first end to the drive wheel and having a hinge disposed at a middle portion thereof to connect to the body frame to enable the drive frame to pivot with respect to the body frame such that a second end thereof and the drive wheel pivot with the drive frame, a rear frame body that extends through the corresponding at least one stopper and is connected at a first end to a rear wheel and has a sliding part connected at a second end thereof wider than the rear frame body to be stopped by the corresponding stopper, and a linkage member connected at one end to the second end of the drive frame to pivot with the drive frame and including another end that contacts the sliding part of the rear frame body to move the rear wheel in a substantially perpendicular direction with respect to the body frame such that when the drive frame pivots by a predetermined amount, the drive wheel and the rear wheel move in the direction substantially perpendicular with respect to the body frame.

The stopper may include a guide recess extending through the frame body, and the rear frame body may comprise: a guide projection which extends along a length thereof along the guide recess, and a rear pressing member which extends along an outer portion of the rear frame body between the stopper and the sliding part of the rear frame body to bias the rear frame body in an upward direction such that the rear pressing member provides a reaction force to a force provided by the linkage member when the linkage member contacts the sliding part to move the rear wheel.

The traveling robot may further comprise a drive pressing member disposed between the body frame and the driving member to press the driving member to rotate to lower the drive wheel relative to the body frame.

The drive pressing member may comprise a first end supported by the body frame, a second end supported by the drive frame and an elastic member which biases the one end away from the second end.

The foregoing and/or other aspects and utilities of the present general inventive concept can be achieved by providing a traveling robot comprising a body frame having a front wheel, a pair of rear wheel assemblies, and a drive wheel assembly disposed between the front wheel and each of the rear wheel assemblies, the rear wheels being movable in a direction substantially perpendicular to a direction in which the robot travels; and a pair of drive frame assemblies each pivotally connected to the body frame and to a respective one of the drive wheel assemblies to provide movement of the respective drive wheel assembly in the direction substantially perpendicular to the direction in which the robot travels, each drive frame assembly including a linking member extending therefrom to contact the respective rear wheel assembly to link movement of the drive wheel assembly with movement of the respective rear wheel assembly.

The rear wheel assemblies may comprise a rear frame extending through the body frame and connected at one end to a rear wheel and having another end with a sliding shape and a pressing member to apply a force to the rear frame upward in the direction substantially perpendicular to the direction in which the robot travels.

When the drive wheel assembly moves in an upward direction the linking member of the corresponding drive frame assembly biases the corresponding rear wheel assembly in a downward direction against the force applied by the pressing member.

When the drive wheel assembly moves in a downward direction the linking member of the corresponding drive frame assembly comes out of contact with the corresponding rear wheel assembly such that the rear wheel assembly is biased upward by the force applied by the pressing member.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIGS. 1A to 1C are schematic views illustrating traveling states of a conventional traveling robot;

DETAILED DESCRIPTION OF THE PREFERRED EMBODIMENTS

Figure 1A:
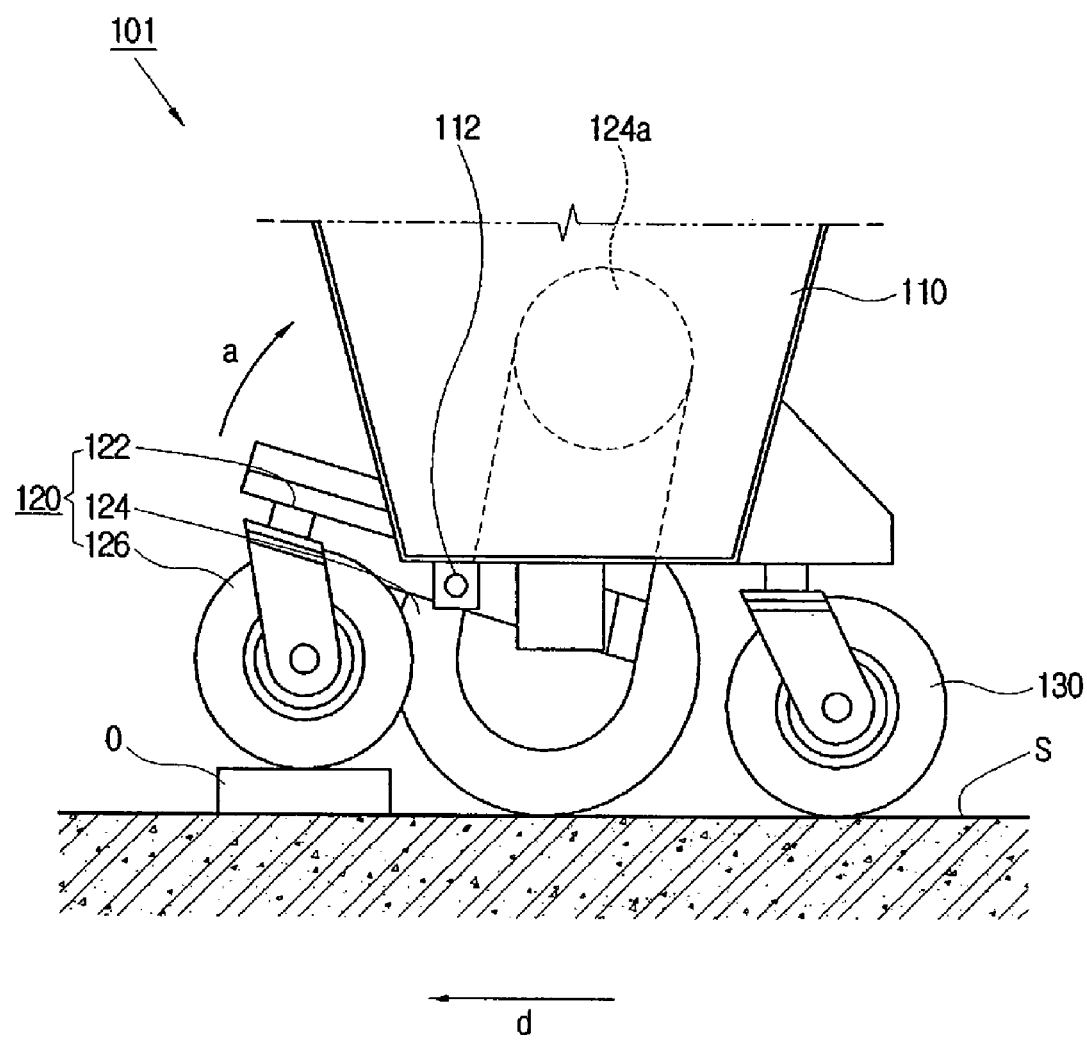
Figure 1B:
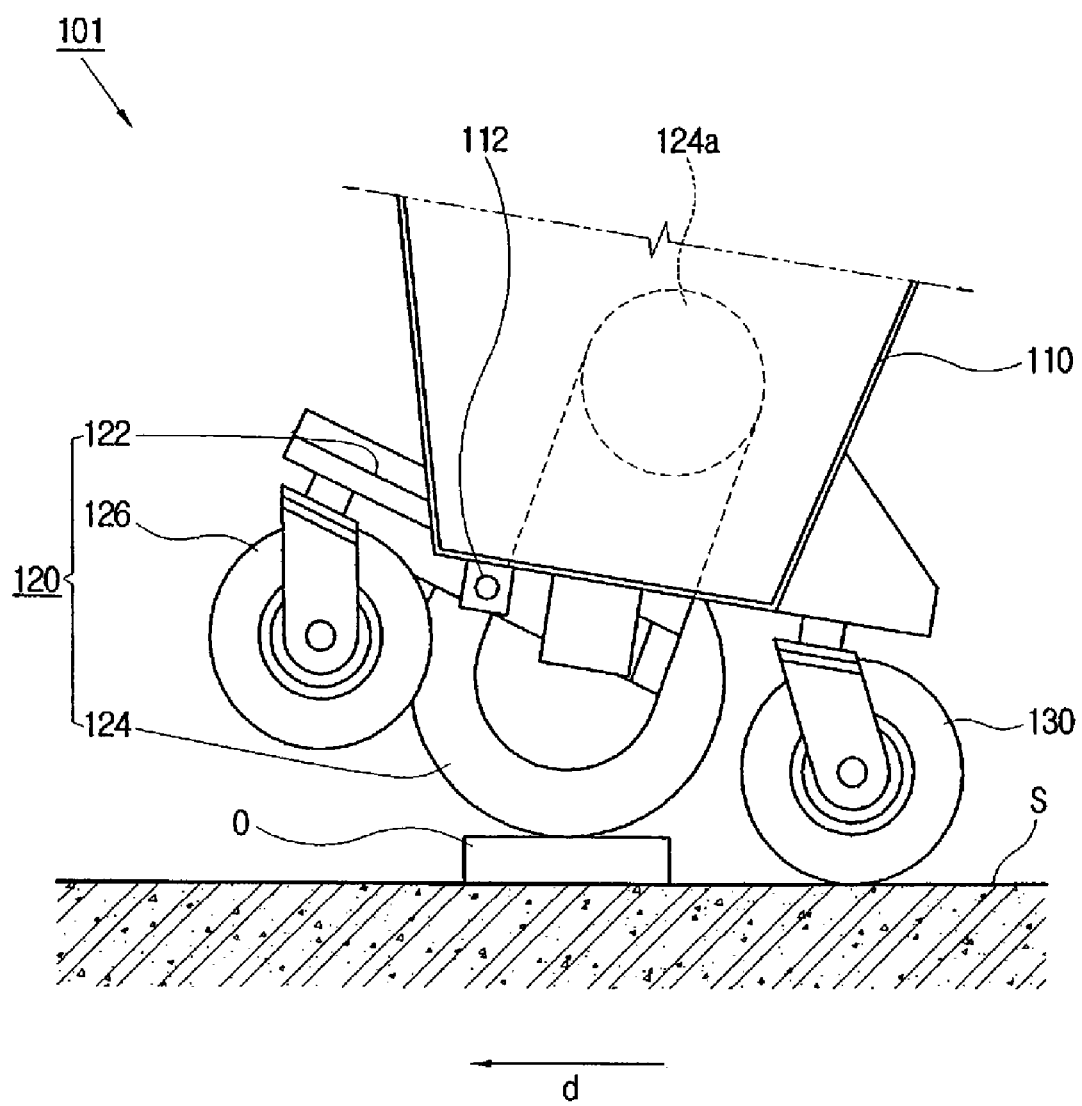

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
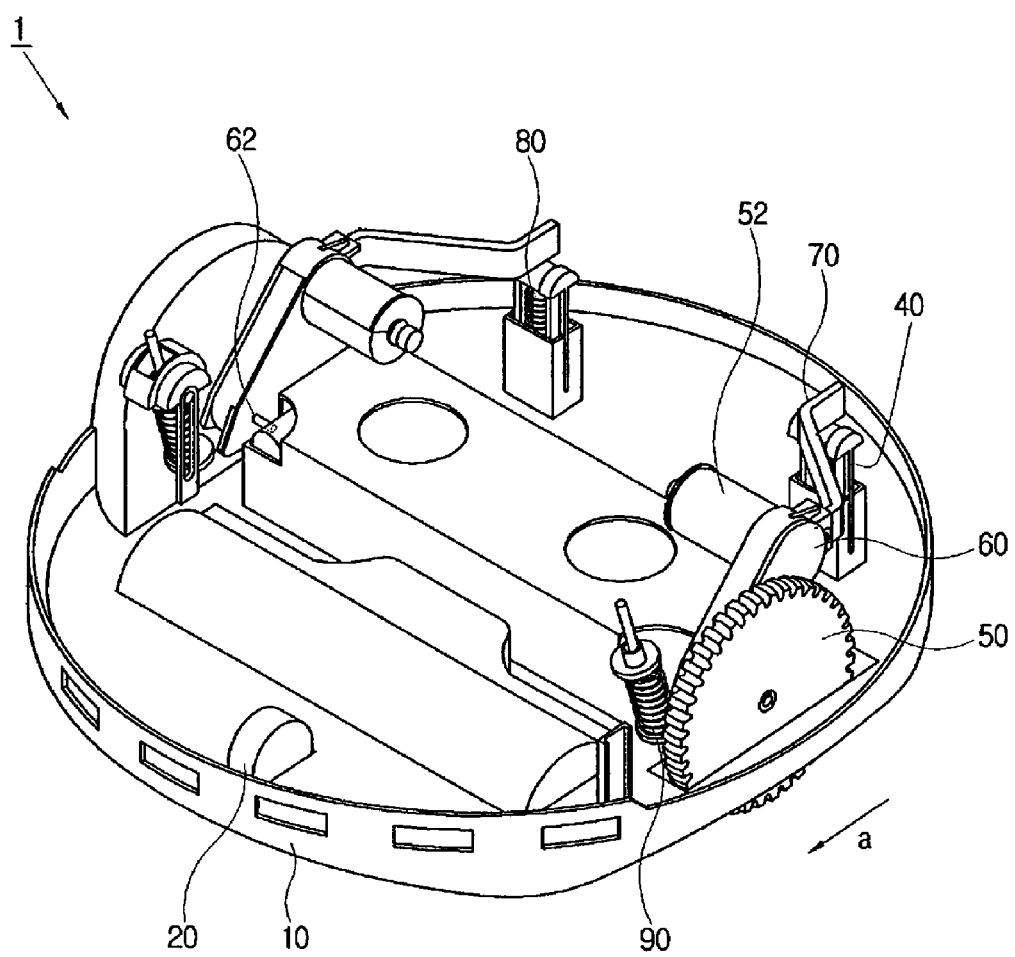
FIG. 2 is a perspective view of a traveling robot according to an embodiment of the present general inventive concept.
Figure 3:
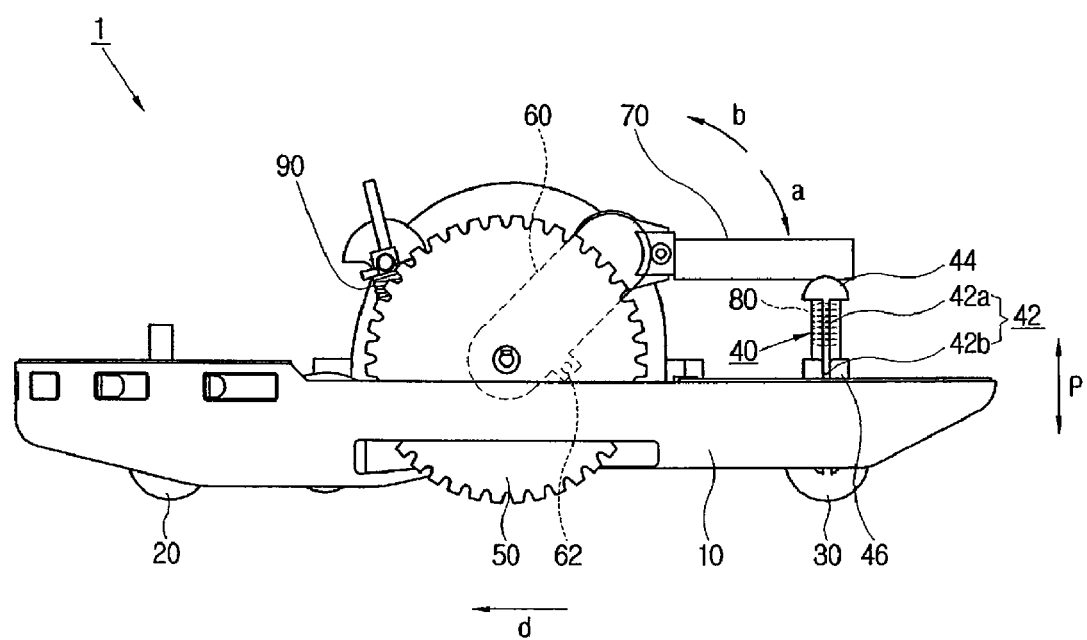
FIG. 3 is a side view of the traveling robot in FIG. 2.
Figure 4:
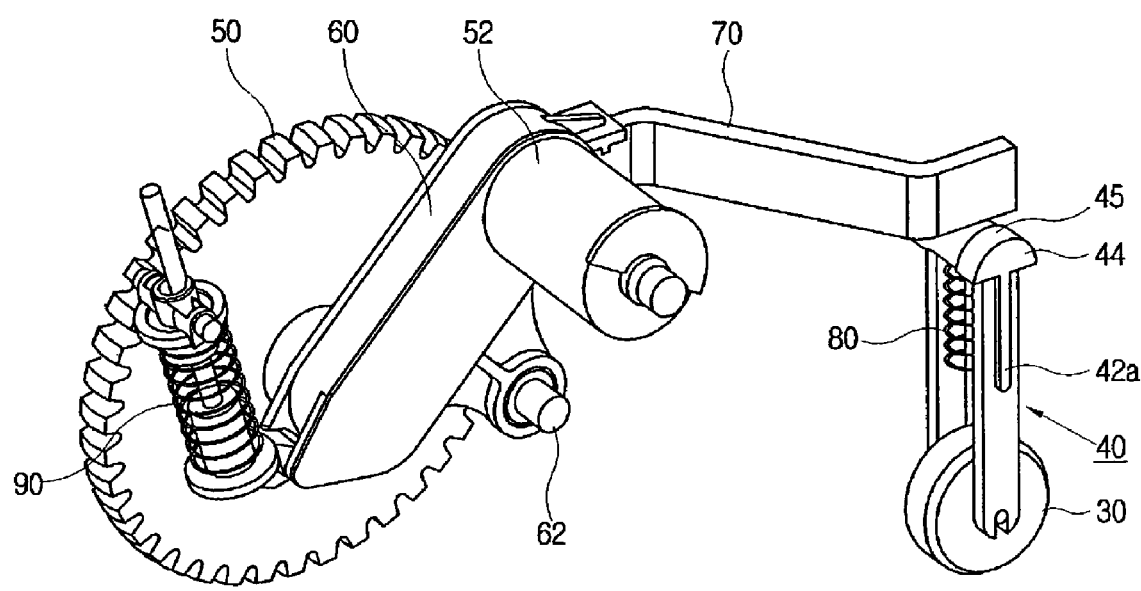
FIG. 4 is a perspective view of a main part of the traveling robot in FIG. 2.

Referring to FIGS. 2 to 4, a traveling robot 1 comprises a body frame 10, a front wheel 20, a rear wheel 30, a rear frame 40, a driving wheel 50, a driving frame 60 and a linkage member 70. The body frame 10 is provided with a function performing part (not illustrated) to perform predetermined functions. The traveling robot 1 may be a cleaning robot in which the body frame 10 is equipped with a cleaning part (not illustrated) to clean a traveling surface, a display robot having the body frame 10 which is equipped with a display part (not illustrated) to display information, or a robot to perform any other performance.

The front wheel 20 is supported on a front side of the body frame 10, which is located in a front portion with respect to a traveling direction "d" of the body frame 10. The front wheel 20 supports the body frame 10 against the surface being traveled across. Though the front wheel 20 is illustrated in FIG. 2 as being a single front wheel 20, a plurality of front wheels 20 may be disposed to be arranged in a direction perpendicular to the traveling direction "d." The front wheel 20 may have a steering function. Further, although the front wheel 20 is illustrated to be supported by the body frame 10 to be rotated idly, it may be driven by a driving motor.

The rear wheel 30 is disposed on the rear side of the body frame 10, which is located on the opposite side of the body frame 10 with respect to the position of the front wheel 20.

The rear wheel 30 is supported by the rear frame 40 to be rotated idly. In another embodiment, the rear wheel 30 may be driven by a driving motor.

The rear frame 40 supports the rear wheel 30, and is supported by the body frame 10 so as to slide vertically relative to the body frame 10 (or with respect to the direction in which the robot travels). As the rear frame 40 slides vertically relative to the body frame 10, the rear wheel 30 also slides vertically relative to the body frame 10. The rear frame 40 has a first stopper 46 to prevent the rear frame 40 from further sliding downwardly from a predetermined position so as not to be separated from the body frame 10. Also, the rear frame 40 may have a second stopper (not illustrated) to prevent the rear wheel 30 from further sliding upwardly from a contact position where the rear wheel 30 is projected from the body frame 10 to be contacted with the surface being traveled across. According to another embodiment of the present general inventive concept, the rear frame 40 may further include a rear pressing member 80 to press the rear frame 40 upward by an elastic force.

The driving wheel 50 is disposed between the front wheel 20 and the rear wheel 30. The driving wheel 50 causes the traveling robot 1 to travel in the traveling direction "d" (forward). However, the driving wheel 50 may also cause the traveling robot 1 to travel in an opposite direction of the traveling direction "d" (backward). The driving wheel 50 receives a driving force from a driving motor 52. A power transmitting unit (not illustrated) to transmit the driving force is disposed between the driving wheel 50 and the driving motor 52.

The driving frame 60 supports the driving wheel 50 and is coupled to the body frame 10 by a hinge 62 extending in the same direction as an axis of the driving wheel 50. As the driving frame 60 is rotated about the hinge 62 relative to the body frame 10, the driving wheel 50 is also rotated around the hinge 62 so as to move vertically relative to the length of the body frame 10.

Between the driving wheel 50 and the rear wheel 30 is disposed the hinge 62 which connects the driving frame 60 with the body frame 10. (See FIG. 3) If the weight of the traveling robot 1 is applied to the hinge 62 when the traveling robot 1 is positioned on the surface being traveled across, the driving frame 60 is rotated in a direction "a" to allow the linkage member 70 to press the rear frame 40. Therefore, when the traveling robot travels, the linkage member 70 contacts the rear frame 40, so that the rotation of the driving frame 60 leads to the vertical sliding of the rear frame 40 relative to the body frame 10.

The linkage member 70 is connected to the driving frame 60 to be contacted with or separated from the rear frame 40 as the driving frame 60 is rotated relative to the body frame 10. The linkage member 70 is joined to the driving frame 60 to integrally move with the driving frame 60, so that the linkage member 70 is rotated about the hinge 62 when the driving frame 60 is rotated about the hinge 62. The linkage member 70 is in contact with or separated from the rear frame 40 according to the rotating position of the driving frame 60.

When the linkage member 70 is in contact with the rear frame 40, the linkage member 70 presses the rear frame 40 to slide downwardly relative to the body frame 10. Therefore, the linkage member 70 links the rotation of the driving frame 60 with the vertical sliding of the rear frame 40 so that the driving wheel 50 and the rear wheel 30 are linked to each other to move vertically relative to the plane of the body frame 10. If the driving wheel 50 moves upwardly relative to the body frame 10, the driving frame 60 is rotated about the hinge 62 in the direction "a" and the linkage member 70 contacts the rear frame 40, thereby pressing the rear frame 40 to lower the position of the rear wheel 30 relative to the body frame 10. In contrast, if the rear wheel 30 moves upwardly relative to the body frame 10, the rear frame 40 presses the linkage member 70 to rotate the driving frame 60 about hinge 62 in a direction "b," thereby lowering the position of the driving wheel 50 relative to the body frame 10. When the linkage member 70 is separated from the rear frame 40, the rear frame 40 slides vertically relative to the body frame 10 without the restriction caused by the rotation of the driving frame 60. In this case, the driving wheel 50 and the rear wheel 30 can independently move relative to the body frame 10.

Although the linkage member 70 is joined to the driving frame 60 to integrally move with the driving frame 60, according to another embodiment of the present general inventive concept, the linkage member 70 may be connected to the driving frame 60 so as to be disposed to be contacted to or separated from the rear frame 40 according to the rotating position of the driving frame 60.

The hinge 62 can be positioned within a predetermined distance from the center of gravity of the traveling robot 1. That is, the hinge 62 which joins the driving frame 60 with the body frame 10 can be positioned at the center of gravity or in an area adjacent to the center of gravity. Therefore, when the driving frame 60 is rotated relative to the body frame 10 as a result of the traveling robot 1 traveling on an uneven surface, the shift of the center of gravity of the traveling robot 1 can be minimized, thereby maintaining a traction force of the driving wheel 50 with respect to the surface being traveled on, thus preventing the swaying of the body frame 10 and enhancing the traveling performance of the traveling robot 1.

The rear wheel 30, the rear frame 40, the driving wheel 50, the driving frame 60 and the linkage member 70 may be provided in pairs and therefore being disposed on both sides of the body frame 10 to be operated independently on each side. In this case, the pair of driving wheels 50 are driven by respective driving motors 52 which are driven independently between themselves. The pair of rear wheels 30, the pair of rear frames 40, the pair of frames 60 and the pair of linkage members 70 are also operated and independently driven each between themselves. Therefore, when the right and left driving wheels 50 are rotated on the surface being traveled on, which is uneven with respect to each of the sides of the wheels 50, the respective driving wheel 50 can travel properly by adapting itself to the respective surface being traveled on.

The pair of rear wheels 30 are positioned within a region of the pair of driving wheels 50 in the axis direction of the driving wheel 50. In other words, the distance between the pair of rear wheels 30 is smaller than the distance between the pair of driving wheels 50. Accordingly, when the traveling robot 1 travels on a traveling surface which is formed with a stepped part having a width narrower than the distance between the pair of driving wheels 50, the pair of rear wheels 30 contact the stepped surface to support the body frame 10. (See FIGS. 6A and 6B) According to another embodiment of the present general inventive concept, the rear wheels 30 may be disposed in a line with the driving wheels 50. Alternatively, the rear wheels 30 may be disposed such that the distance between the rear wheels 30 is larger than the distance between the driving wheels 50.

According to another embodiment of the present general inventive concept, three or more groups of the rear wheel 30, the rear frame 40, the driving wheel 50, the driving frame 60, and the linkage member 70 may be disposed on the body frame 10.

The traveling robot 1 has a guide 42 (see FIG. 3) which is provided between the body frame 10 and the rear frame 40 and extends in a direction p perpendicular to the axis of the driving wheels 50 to guide the rear frame 40 so that the rear frame 40 slides in the direction p, which is also perpendicular to the plane of the body frame 10. The guide 42 has a guide projection 42a which extends in the direction p on the rear frame 40 and a guide recess 42b which is formed on the body frame 10 to guide the guide projection 42a. As the guide projection 42a slides along the guide recess 42b, the rear frame 40 slides in the direction p relative to the body frame 10. According to another embodiment of the present general inventive concept, the guide projection 42a may be formed on the body frame 10 and the guide recess 42b may be formed on the rear frame 40.

As the rear frame 40 slides in the direction p relative to the body frame 10, the rear frame 40 may be supported to slide vertically relative to the body frame 10 with a simple structure. Therefore, the traveling robot 1 can be easily manufactured, and thus manufacturing costs can be saved. According to another embodiment of the present general inventive concept, the rear frame 40 may be supported to slide not in the direction p, but in a decline direction, in a circumferential direction around the hinge 62 or in any other curved direction relative to the body frame 10.

The rear frame 40 has a sliding part 44 which slidably contacts the linkage member 70. The linkage member 70 extends from the driving frame 60 to be contacted with an end of the rear frame 40, and the sliding part 44 has a curved sliding surface 45 which is formed on the end of the rear frame 40. According to another embodiment of the present general inventive concept, the linkage member 70 may extend to contact any other portion except for the end of the rear frame 40 and the sliding part 44 may be disposed on a part which is contacted by the linkage member 70.

The sliding part 44 allows the linkage member 70 to smoothly slide relative to the rear frame 40, so that the rear frame 40 and the driving frame 60 can easily move vertically and be rotated respectively without being restricted by the movement between each other when the rear frame 40 and the driving frame 60 move in different directions. The sliding part 44 allows the rear frame 40 to slide in the direction p irrespective of the rotating direction of the driving frame 60. According to another embodiment of the present general inventive concept, the sliding part 44 may be omitted, and the linkage member 70 may be directly contacted with a frame surface the rear frame 40.

The traveling robot 1 has a rear pressing member 80 which is provided between the body frame 10 and the rear frame 40 to press the rear frame 40 upwardly relative to the body frame 10. The rear pressing member 80 has one end which is supported by the body frame 10 and another end which is supported by the rear frame 40 to lift the rear frame 40 relative to the body frame 10 by an elastic force. Thus, when an external force is not applied to the rear frame 40, the rear frame 40 is prevented from descending to be projected from the body frame 10. The rear pressing member 80 may be a coil spring, a plate spring or any other spring.

The traveling robot 1 has a drive pressing member 90 (see, for example, FIGS. 3 and 4) which is provided between the body frame 10 and the driving frame 60 to press the driving frame 60 to rotate, thereby lowering the driving wheel 50 relative to the body frame 10. The drive pressing member 90 has one end which is supported by the body frame 10 and another end which is supported by the driving frame 60 at an opposite side of the driving frame 60 from which the hinge 62 is disposed. Thus, the axis of the driving wheel 50 is interposed between the point at which the drive pressing member 90 is supported by the driving frame 60 and the hinge 62. The drive pressing member 90 rotates the driving frame 60 in a direction "b" to lower the driving wheel 50 relative to the body frame 10. The drive pressing member 90 increases a traction force of the driving wheel 50 against the surface being traveled on and prevents the driving wheel 50 from sliding on the that surface.

Hereinafter, an operation of the traveling robot according to an embodiment of the present general inventive concept will be described with reference to FIGS. 5A to 6B.

Figure 5A:
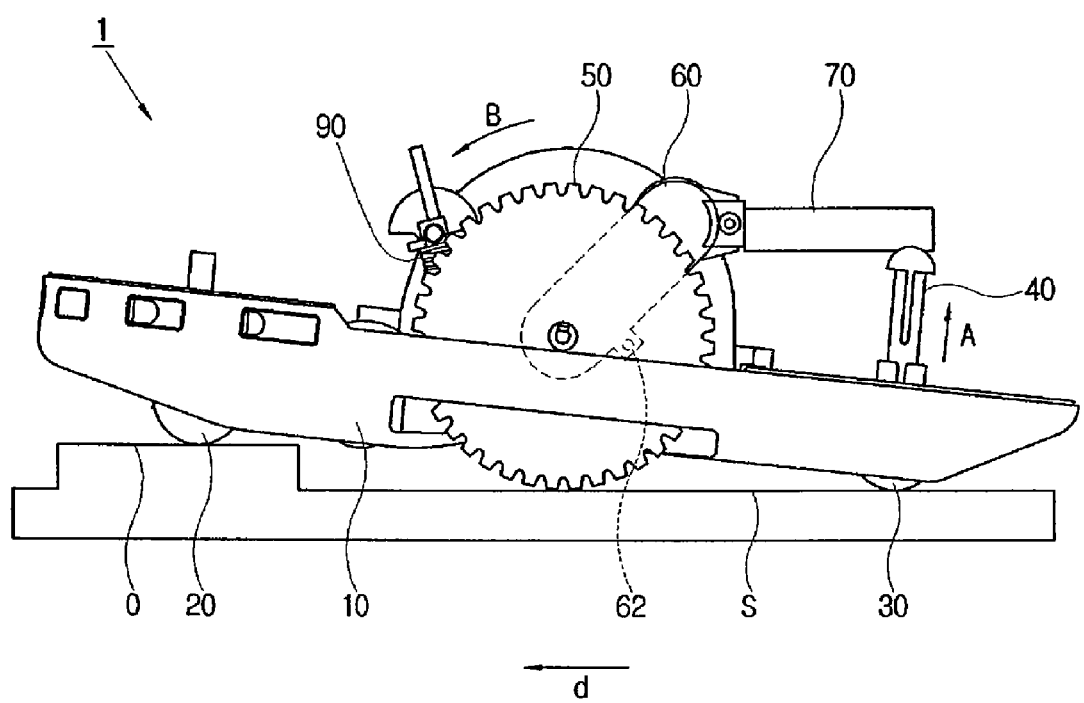
FIGS. 5A to 5C are side views illustrating the traveling states of the traveling robot in FIG. 2.
Figure 5B:
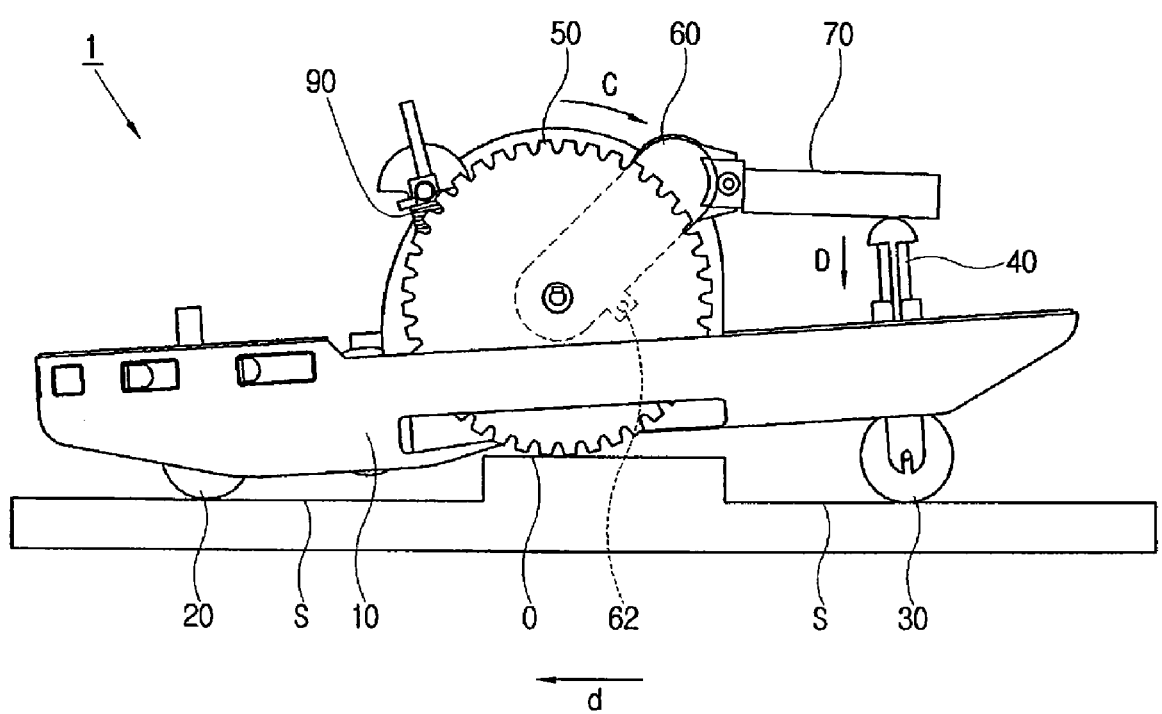
Figure 5C:
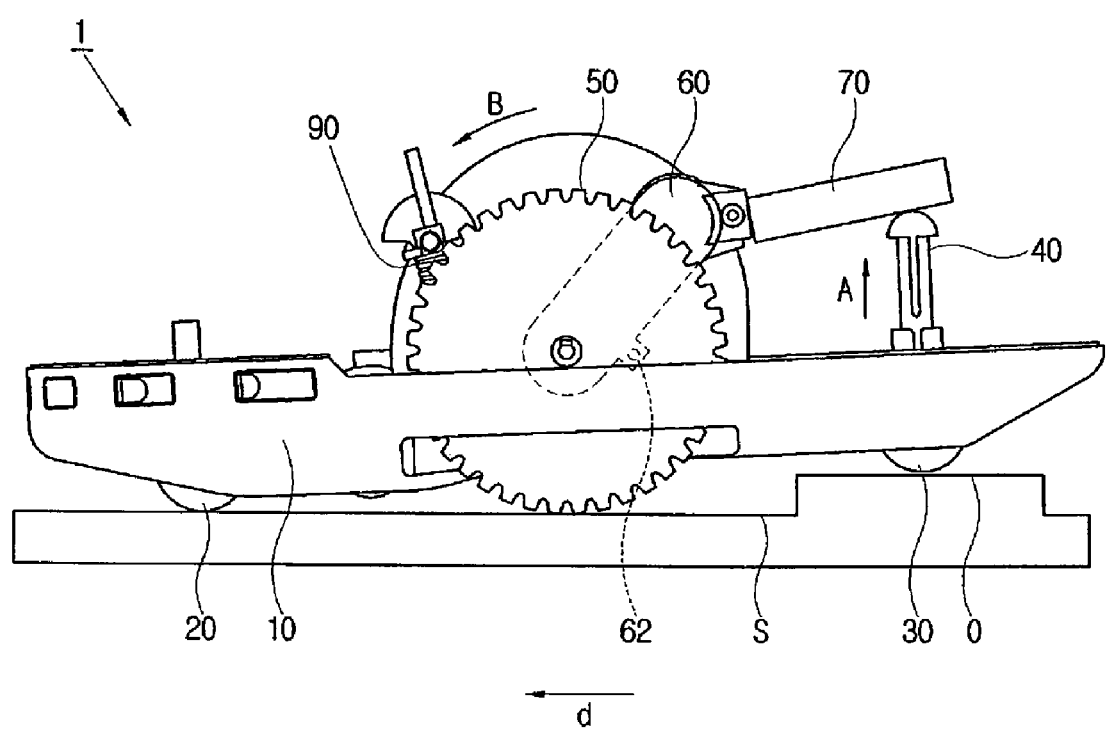

FIGS. 5A to 5C are side views illustrating the traveling states of the traveling robot in FIG. 2. The traveling robot 1, as illustrated in FIGS. 5A to 5C, travels on an uneven surface which has a stepped part along the driving direction "d." Referring to FIG. 5A, as the front wheel 20 climbs up the stepped surface 0, the weight of the traveling robot 1 is concentrated on the rear wheel 30, so that the rear frame 40 slides upwardly relative to the body frame 10. (See arrow "A") Then, the rear frame 40 presses the linkage member 70 and the linkage member 70 rotates the driving frame 60 around the hinge 62 to lower the driving wheel 50 relative to the body frame 10. (See arrow "B") Therefore, the driving wheel 50 can maintain enough traction force against the surface S being traveled on to drive the traveling robot 1 without difficulty.

Referring to FIG. 5B, when the traveling robot 1 further travels and then the driving wheel 50 climbs up the stepped surface 0, the weight of the traveling robot 1 is concentrated on the driving wheel 50, so that the driving wheel 50 moves upwardly relative to the body frame 10, and the driving frame 60 is rotated around the hinge 62 so that the linkage member 70 can press the rear frame 40. (See arrow "C") The linkage member 70 lowers the rear frame 40 relative to the body frame 10 (See arrow "D"), so that the rear wheel 30 may be supported by the surface S being traveled on which is lower than the stepped surface 0. Therefore, the driving wheel 50 can maintain enough traction force and the rear wheel 30 is supported by the surface S, thereby preventing the body frame 10 from coming into contact with the surface S being traveled on.

Referring to FIG. 5C, when the traveling robot 1 further travels, the driving wheel 50 surmounts the stepped part to reach the surface S being traveled on, and then the rear wheel 30 is positioned on the stepped part 0, wherein the weight of the traveling robot 1 is then concentrated on the rear wheel 30. The rear wheel 30 then moves upwardly relative to the body frame 10 (See arrow "A") and the linkage member 70 is pressed by the rear frame 40, whereby the driving frame 60 is rotated (See arrow "B") so that the driving wheel 50 moves downwardly relative to the body frame 10. Therefore, the driving wheel 50 contacts the traveling surface 0 which is lower than the stepped surface 0 to ensure the proper traction force to drive the traveling robot 1.

As described above, when the traveling robot 1 travels on the surface S which includes the stepped surface 0, as the position on which the weight of the traveling robot 1 is concentrated is changed, the linkage member 70 links the rotation of the driving frame 60 with the vertical sliding of the rear frame 40. As a result, the driving wheel 50 is ensured to have enough traction force and the body frame 10 is prevented from contacting the stepped surface 0.

Figure 6A:
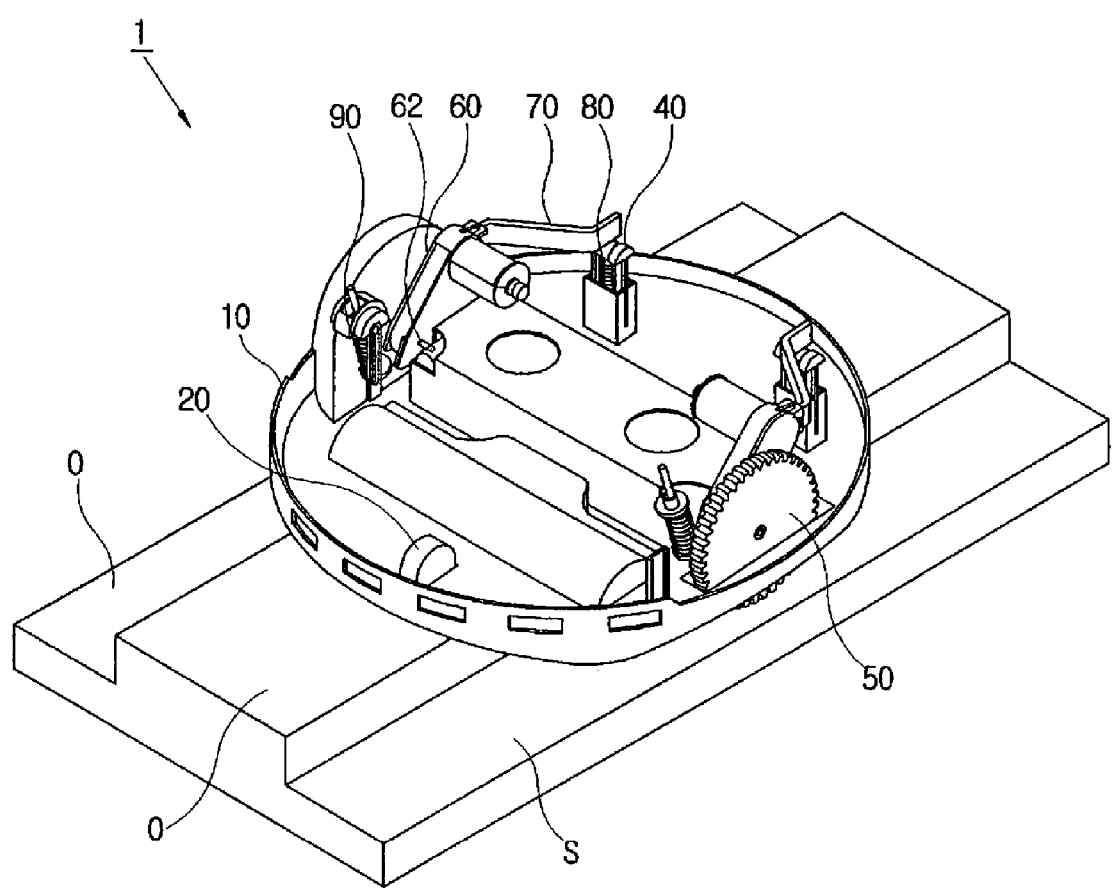
FIGS. 6A and 6B are views illustrating other traveling states of the traveling robot in FIG. 2.
Figure 6B:
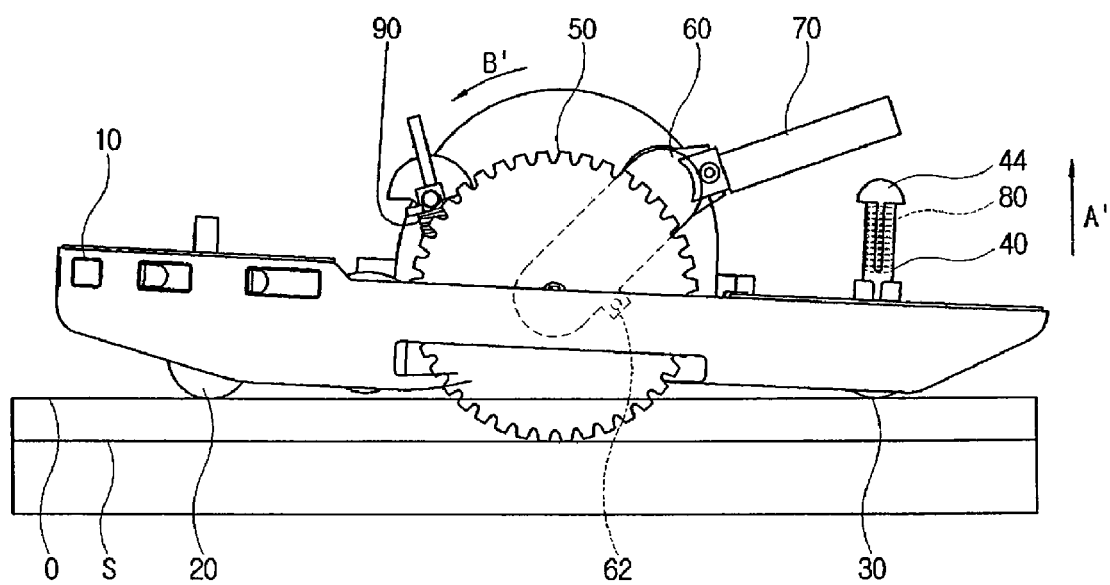

FIGS. 6A and 6B illustrate another traveling state of the traveling robot in FIG. 2. The traveling robot 1, as illustrated in FIGS. 6A and 6B, travels on a surface S. The surface S on which the robot 1 travels on is formed with a stepped surface 0 whose width is narrower than the distance between the driving wheels 50. While the driving wheels 50 contact the surface S, the rear wheels 30 contact the stepped surface 0 which is formed on the surface S. The weight of the traveling robot 1 is then concentrated on the rear wheels 30, so that the rear frame 40 slides upwardly relative to the body frame 10. (See arrow "A'") Since the surface S which the driving wheels 50 are in contact with is lower than the stepped surface 0 which the rear wheels 30 are in contact with, the driving wheels 50 further move downwardly relative to the body frame 10 as compared to the driving wheels 50 which travel on the stepped surface illustrated in FIGS. 5A to 5C or on any other ordinary surface, so that the driving frame 60 is rotated to allow the linkage member 70 to be separated from the rear frame 40. (See arrow "B'")

The driving frame 60 and the rear frame 40 can move independently with respect to each other. Although the driving frame 60 can be rotated with a considerable rotating angle, the rear frame 40 may not slide upwardly more than a predetermined position since the rear frame 40 is separated from the driving frame 60. Thus, the rear wheel 30 can keep its position where the rear wheel 30 can be projected to a minimum from the body frame 10 to prevent the body frame 10 from contacting the stepped surface 0.

Further, since the driving frame 60 and the rear frame 40 are independent with respect to each other, the driving frame 60 may not be restricted by the position of the rear frame 40 and may be rotated around the hinge 62. Therefore, the driving wheel 50 may move downwardly relative to the body frame 10 enough to contact the traveling surface S, so that it can ensure enough traction force.

From the foregoing, the traveling robot according to the embodiments of the present general inventive concept may have an enhanced traveling performance with a simple structure.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A traveling robot comprising:
   a body frame having a front wheel;
   a rear wheel disposed behind the front wheel with respect to a traveling direction of the robot;
   a rear frame which supports the rear wheel and is supported by the body frame to move vertically relative to a plane of the body frame;
   a driving wheel disposed between the front wheel and the rear wheel;
   a driving frame which supports the driving wheel and is coupled to the body frame by a hinge whose axis is parallel to an axis of the driving wheel; and
   a linkage member coupled to the driving frame to be contacted with the rear frame so that the driving wheel and the rear wheel are linked to each other and separated from the rear frame so that the driving frame and the rear frame are independent with respect to each other as the driving frame is rotated relative to the body frame.

2. The traveling robot according to claim 1, wherein the hinge is positioned between the driving wheel and the rear wheel.

3. The traveling robot according to claim 2, further comprising:
   a guide provided between the body frame and the rear frame and extends in a direction perpendicular to the axis of the driving wheel to guide the rear frame to allow the rear frame to move vertically relative to the plane of the body frame.

4. The traveling robot according to claim 3, wherein the rear frame comprises a sliding part to be in sliding contact with the linkage member.

5. The traveling robot according to claim 3, further comprising:
   a drive pressing member provided between the body frame and the driving frame to press the driving frame to rotate so that the driving wheel can move downwardly relative to the body frame.

6. The traveling robot according to claim 1, further comprising:
   a rear pressing member provided between the body frame and the rear frame to press the rear frame upwardly relative to the body frame.

7. The traveling robot according to claim 6, further comprising:
   a guide provided between the body frame and the rear frame and extends in a direction perpendicular to the axis of the driving wheel to guide the rear frame to allow the rear frame to move vertically relative to the plane of the body frame.

8. The traveling robot according to claim 7, wherein the rear frame comprises a sliding part to be in sliding contact with the linkage member.

9. The traveling robot according to claim 7, further comprising:
   a drive pressing member provided between the body frame and the driving frame to press the driving frame to rotate so that the driving wheel can move downwardly relative to the body frame.

10. The traveling robot according to claim 1, further comprising:
    a guide provided between the body frame and the rear frame and extends in a direction perpendicular to the axis of the driving wheel to guide the rear frame to allow the rear frame to move vertically relative to the plane of the body frame.

11. The traveling robot according to claim 10, wherein the rear frame comprises a sliding part to be in sliding contact with the linkage member.

12. The traveling robot according to claim 10, further comprising:
    a drive pressing member provided between the body frame and the driving frame to press the driving frame to rotate so that the driving wheel can move downwardly relative to the body frame.

13. The traveling robot according to claim 1, wherein the hinge is positioned within a predetermined distance from the center of gravity of the traveling robot.

14. The traveling robot according to claim 1, wherein each of the rear wheel, the rear frame, the driving wheel, the driving frame and the linkage member is disposed in pairs, each one of the pair being disposed on opposite sides of the body frame to be operated independently with respect to the other.

15. A traveling robot comprising:
    a body frame having a front wheel and at least one stopper; and
    at least one driving assembly disposed between the front wheel and the at least one stopper, the at least one driving assembly comprising:
       a drive wheel to drive the robot to travel,
       a drive frame connected at a first end to the drive wheel and having a hinge disposed at a middle portion thereof to connect to the body frame to enable the drive frame to pivot with respect to the body frame such that a second end thereof and the drive wheel pivot with the drive frame, a rear frame body that extends through the corresponding at least one stopper and is connected at a first end to a rear wheel and has a sliding part connected at a second end thereof wider than the rear frame body to be stopped by the corresponding stopper, and a linkage member connected at one end to the second end of the drive frame to pivot with the drive frame and including another end that contacts the sliding part of the rear frame body to move the rear wheel in a substantially perpendicular direction with respect to the body frame such that when the drive frame pivots by a predetermined amount, the drive wheel and the rear wheel move in the direction substantially perpendicular with respect to the body frame.

16. The traveling robot according to claim 15, wherein the stopper includes a guide recess extending through the frame body, and the rear frame body comprises:

a guide projection which extends along a length thereof along the guide recess, and a rear pressing member which extends along an outer portion of the rear frame body between the stopper and the sliding part of the rear frame body to bias the rear frame body in an upward direction such that the rear pressing member provides a reaction force to a force provided by the linkage member when the linkage member contacts the sliding part to move the rear wheel.

17. The traveling robot according to claim 16, further comprising:

a drive pressing member disposed between the body frame and the driving member to press the driving member to rotate to lower the drive wheel relative to the body frame.

18. The traveling robot according to claim 17, wherein the drive pressing member comprises a first end supported by the body frame, a second end supported by the drive frame and an elastic member which biases the one end away from the second end.

19. The traveling robot according to claim 15, wherein the at least one stopper comprises a first stopper disposed at one side of the rear portion of the frame body and a second stopper disposed at another side of the rear portion of the frame body, and the at least one drive assembly comprises first and second drive assemblies to correspond with the first and second stoppers, respectively.

* * * * *